Dec. 19, 1961  D. R. GWIN ET AL  3,013,833
VACUUM PICK UP DEVICE
Filed Dec. 1, 1958  3 Sheets-Sheet 1

INVENTORS
DEAN R. GWIN
CHARLES . McFARLAND
JAMES M. GWIN
BY
ATTORNEY

Dec. 19, 1961   D. R. GWIN ET AL   3,013,833
VACUUM PICK UP DEVICE

Filed Dec. 1, 1958   3 Sheets-Sheet 2

INVENTORS,
DEAN R. GWIN
CHARLES W. McFARLAND
JAMES M. GWIN
BY *Ivan P. Tachof*
ATTORNEY INVENTORS,
DEAN R. GWIN
CHARLES W. McFARLAND
JAMES M. GWIN
BY
ATTORNEY 3,013,833
VACUUM PICK UP DEVICE
Dean R. Gwin and Charles W. McFarland, both of Rte. 4, Tyrone, Pa., and James M. Gwin, 72 Frederick Lane, Glendale 22, Mo.
Filed Dec. 1, 1958, Ser. No. 777,287
20 Claims. (Cl. 294—65)

The present invention relates to a device for picking up, transporting and handling articles. More particularly, it is directed to a portable vacuum device for picking up, transferring and depositing groups of eggs or similar articles.

In the handling of eggs, it is necessary to transfer them from case to case, from case to carton, or to place them on automatic conveyor lines for further processing.

In the prior art, devices have been provided for simultaneously picking up a plurality of eggs during the necessary transfer operations during handling. These devices are provided with a support having thereon a plurality of vacuum chucks in spaced predetermined relationship. These vacuum chucks are positioned over the eggs and a partial vacuum is created in these chucks to hold the eggs in secure engagement therewith.

In each of the prior art devices, the source of vacuum was a fixed stationary vacuum pump connected by means of conduits to the portable pick up device itself. On the portable device there are positioned valves which are utilized to make and break the vacuum connection between the vacuum pump and the chucks. Generally the vacuum chucks are positioned over the eggs, the valves are actuated to reduce the pressure in the chucks which will draw the eggs into secure engagement with the chucks, the eggs are lifted and transported where desired and the vacuum is broken to release the eggs from the chucks.

It is evident that the conduits and vacuum pumps employed in the prior art devices severely limit the mobility, portability and usefulness of the prior art devices. In addition, because of the ever present vacuum lines, the devices frequently became entangled.

In accordance with the present invention, all need for external vacuum sources, the associated conduits or any other external connection has been eliminated.

The present invention, in its broadest aspect, is directed to a portable device having at least one vacuum chuck thereon for engaging the article to be picked up and means on said device for creating a partial vacuum in the vacuum chucks without requiring any connection external of the device for supplying a source of vacuum. In other words, the vacuum is created within the device itself.

More particularly, there is provided adjacent the vacuum chucks a means defining a chamber of variable volume with conduit means providing communication between the interior of the chucks and the chamber. In this manner when the articles are in engagement with the chucks, by enlarging the volume of the chamber, a partial vacuum will be created in the chucks to hold the articles in secure engagement therewith. This structure provides means for manually creating vacuum within the device itself.

In order to provide a chamber of variable volume, the chucks are mounted on a base member or plate. Positioned adjacent said base member is a second member or plate and a chamber is defined between said members by positioning therebetween at least one flexible tubular member, one end of said tubular member being secured to the base plate and the other end to the second plate. Thus, when one plate is moved relative to the other plate, the volume of the chamber will vary.

Since the chucks are in communication with the chamber or chambers when the volume of the chamber is increased by moving one of said plates, a partial vacuum will be created in the chuck. The tubular member preferably comprises an accordion bellows.

In accordance with one aspect of the present invention, there is provided one bellows between the plates so that all of the chucks communicate with the single chamber.

In accordance with another aspect of the present invention, there are positioned between the plates a plurality of bellows with one bellows for each chuck or one bellows for a group of chucks. It is evident that in this embodiment, a separate source of vacuum will be provided for each chuck or each group of chucks. It is evident that according to this aspect of the invention, when one bellows is provided for each chuck, it is possible to pick up a plurality of articles even when the number of chucks exceeds the number of articles since communication between one chuck and the atmosphere will not break the vacuum in the chucks engaging the articles. Other advantages of this construction will be pointed out hereinafter.

It is an object of the present invention to provide an article handling device for picking up objects or articles by vacuum without any connection to an external source of vacuum or without any external connection whatsoever.

Another object of the invention is to provide an article handling device wherein the vacuum is created within the device itself.

It is a further object of the present invention to provide an article handling device having great mobility and portability unhampered by vacuum lines or other external connections.

It is another object of the present invention to provide an article handling device having a plurality of hollow vacuum chucks for engaging the articles with means to provide an individual vacuum for each of the chucks in order to enable the device to be used to pick up articles when the number of chucks exceeds the number of articles.

These and other objects will be readily apparent from the following description together with the accompanying drawings.

Figure 1:
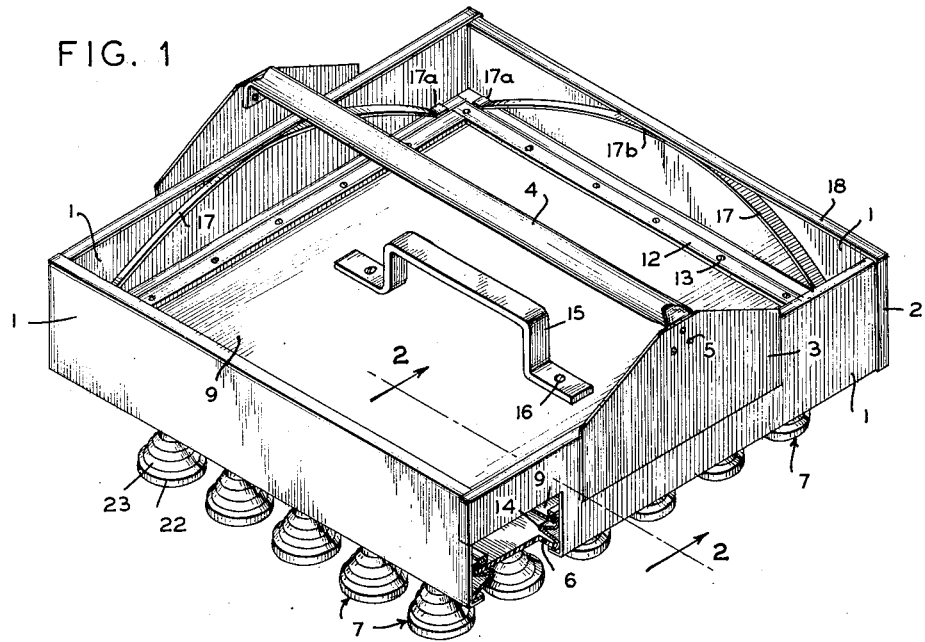
FIG. 1 is a perspective view of the article handling device of the present invention, partly in section.

The portable vacuum pick up device of the present invention (see FIGS. 1 and 2) is provided with two members or plates 6 and 9. The base plate 6 has a plurality of spaced threaded openings 27 therethrough, the openings being arranged in a predetermined relationship. A vacuum chuck means 7 is mounted on one side of the base plate 6 adjacent each opening.

The vacuum chuck 7 (see FIGS. 2 and 3) comprises a flexible resilient accordion bellows portion 23 terminating in an article engaging portion 22. At the other end of chuck 7 is a neck portion 24 having an interior circumferential recess 25. The chuck 7 is mounted adjacent base plate 6 by means of threaded bolt 19 in threaded engagement with each opening 27. The bolt 19 has an enlarged head portion 20 which is seated in the circumferential recess 25 of the neck portion 24. The bolt 19 has a slot 21 to permit removal or insertion of the bolt 19 into threaded opening 27. There is provided a central longitudinal bore 26 in bolt 19 which provides communication between the interior of the hollow vacuum chuck 7 and the side of the base member 6 opposite the vacuum chuck.

Between plates 6 and 9 there is mounted at least one flexible means 14 which defines at least one chamber 11 between the plates. The flexible means 14 preferably comprises a tubular flexible member or bellows. In the preferred construction, this member is an accordion bellows, that is, it has at least one reverse fold which may be made of any desired material which is impermeable to air. Examples of such material are rubber or any other natural or synthetic resilient elastomer.

Figure 2:
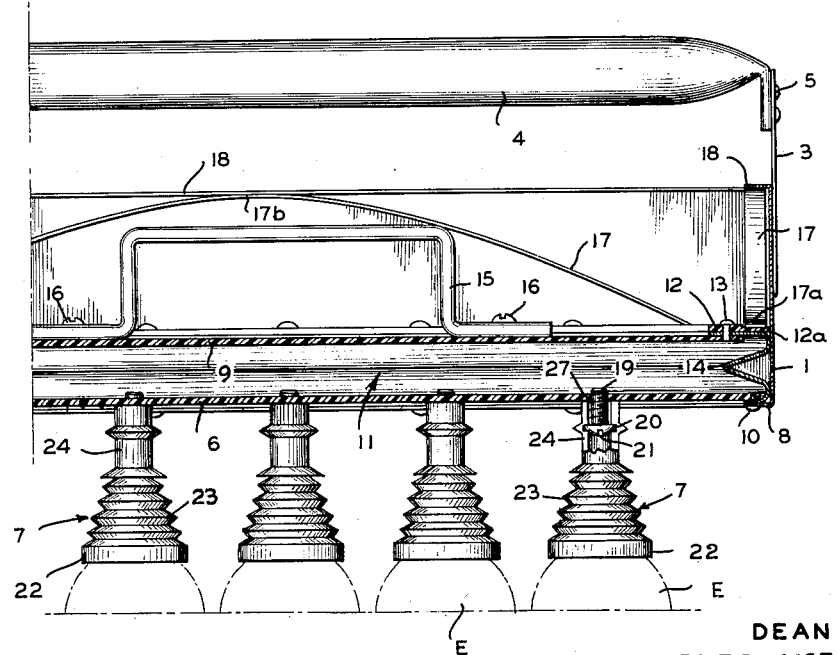
FIG. 2 is a fragmentary view taken along the line 2—2 of FIG. 1, partly in section showing the device in the closed position, that is, prior to the formation of the vacuum.

The bellows or sealing strip 14 in the embodiment illustrated in FIG. 2 has one end secured around the periphery of plate 6 by means of screws 10 which also secure the flange 8 of the frame to the plate 6. The other end of the bellows 14 is secured around the periphery of plate 9 by means of strips 12 which are screwed to plate 9 by screws 13.

In this construction, when one of the plates, preferably the upper or movable plate 9, is moved relative to plate 6 along a line perpendicular to the planes of the plates, the volume of the chamber 11 will be varied, the volume increasing when plate 9 is moved away from plate 6. Thus, it is apparent that when an egg E is in engagement with portion 22 of chuck 7 and plate 9 is moved from the closed position shown in FIG. 2 to the open position shown in FIG. 3, the volume of chamber 11 will be increased and a partial vacuum will be created in the interior of chuck 7 to hold the egg in secure engagement with the portion 22 of chuck 7.

The device of the present invention preferably includes a frame defined by four side panels 1 secured together at their ends 2 to define a rectangle as shown in FIG. 1. It is apparent that the shape of the frame and/or the plates may be varied as desired. Thus, for example, the frame and the plates may be circular (not shown).

Secured to opposed panels 1 are plates 3 which are interconnected by handle 4 by means of screws 5. A handle 15 is secured to upper plate 9 by means of screws 16. In the preferred construction, the spacing between handle 15 and handle 4 is such that they both can be simultaneously engaged by the hand of the operator.

The base plate 6 is fixedly secured to the frame by means of screws 10 which engage inwardly directed flange 8 on each of the panels 1. The handle 4 comprises a carrying handle and when the device of the present invention is superposed over the eggs or other articles to be picked up, when handle 15 is urged toward handle 4 by means of the operator, the volume of chamber 11 will be increased to pick up the eggs. Conversely, when handle 15 is urged away from handle 4, the volume of the chamber will be reduced and the eggs will be released.

In order to assist the operator in causing relative movement between handle 15 and handle 4, there may be provided resilient means which urge the plates either toward or away from each other.

Figure 3:
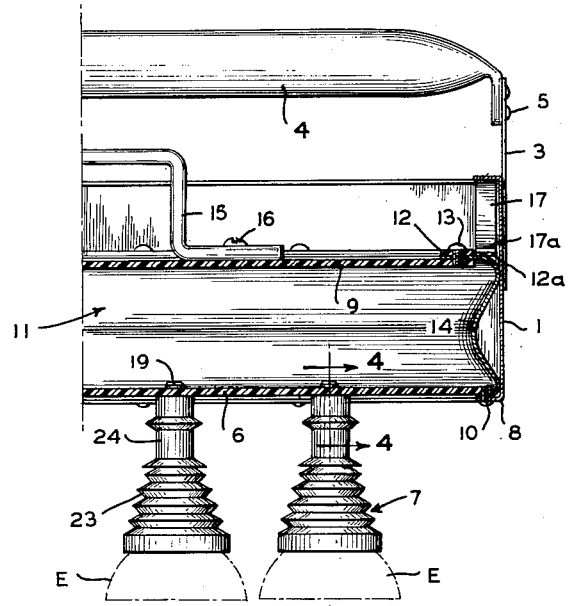
FIG. 3 is a fragmentary view corresponding to FIG. 2 showing the device in the open position, that is, during creation of the vacuum.

In the modification of FIGS. 1–3, the resilient means is constituted by leaf springs 17. The ends 17a of the springs may ride in channels formed in strips 12 defined by a lateral extension 12a of strips 12. The upper portion 17b of each spring 17 is seated or secured to upper inwardly directed flange 18 on panels 1. In this modification, the springs 17 urge the plate 9 toward plate 6. Thus, it is only necessary for the operator to apply a force for moving plate 9 away from plate 6 to create the vacuum. When it is desired to release the eggs, the operator merely has to release his grip on handle 15 and the springs 17 will urge plate 9 toward plate 6 to release the eggs.

Figure 5:
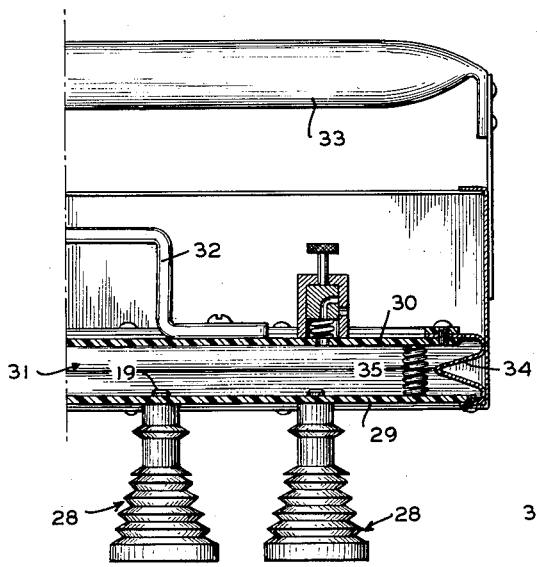
FIG. 5 is a view similar to that of FIG. 2 but showing a modification of the device wherein spring means are provided between the movable and fixed plates.

In the modification shown in FIG. 5, the resilient means is constituted by coil springs 35 or other resilient means positioned between plates 29 and 30 which correspond respectively to plates 6 and 9. A plurality of such springs 35 are provided near the peripheries of the plates 29 and 30.

In the preferred construction of this embodiment coil springs 35 urge the plates 29 and 30 away from each other to enlarge the volume of chamber 31 defined between plates 29 and 30 by bellows 34. In the operation of this modification, the chucks 28 are placed over the eggs and the operator urges handle 32 away from handle 33 to decrease the volume of chamber 31. Upon releasing handle 32, springs 35 urge the plates away from each other to increase the volume of the chamber and create the vacuum within chucks 28.

To release the eggs, the operator again urges handle 32 away from handle 33. It is evident that the coil springs 35 can be so constructed that in their normal relaxed position, the plates 29 and 30 are maintained in the closed position, that is, with the volume in chamber 31 at the minimum. With the springs in this normal position, the device of FIG. 5 would be used precisely in the manner of the modification of FIGS. 1–3.

It is evident that any type of frame can be used in accordance with the present invention. In fact, the device will operate successfully, although not as conveniently, without any frame at all.

In the modifications illustrated in FIGS. 1–5, there has been provided a single bellows defining a single chamber with all the chucks being in communication with said chamber by means of the conduit means or passageway defined by bore 26 of bolt 19. It is frequently desirable to provide a plurality of chambers with groups of chucks or individual chucks communicating with different chambers.

Figure 4:
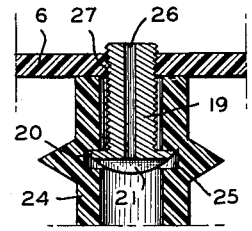
FIG. 4 is a cross-section along the line 4—4 of FIG. 3.
Figure 6:
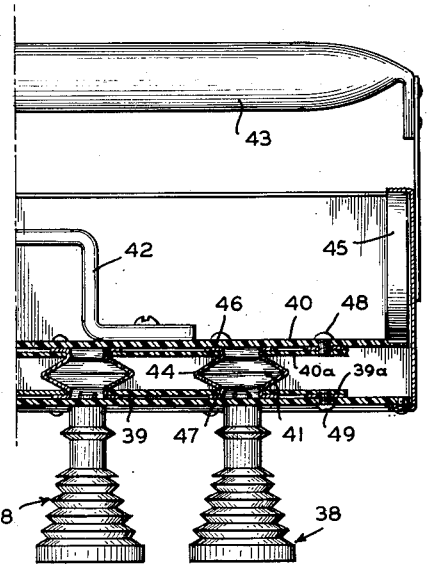
FIG. 6 is a fragmentary section corresponding to FIG. 2 showing another modification wherein there are provided separate means for providing vacuum around each of the hollow means for engaging the article to be picked up.

In FIG. 6 there is shown a modification where there is a separate chamber for each chuck. In accordance with this modification, there is provided a base plate 39 having a plurality of chucks 38 mounted thereon in the same manner as illustrated in FIGS. 2 and 4. There is also provided an upper or movable plate 40. Between these plates adjacent each chuck 38 there is secured in any desirable manner individual tubular bellows 44, preferably accordion bellows. Each bellows is provided at the lower end thereof with an outwardly extending flange 47 and at the upper end thereof with another outwardly extending flange 46.

The lower flanges 47 are positioned between base plate 39 and lower securing plate 39a, the latter being perforated to permit the bellows to extend therethrough. Plates 39 and 39a are secured to each other by a plurality of bolts 49.

The upper flange 46 of each bellows is similarly secured between upper plate 40 and upper securing perforated plate 40a by means of bolts 48. In this construction, the lower plate 39 may be secured to a frame in a similar manner as shown in the embodiment of FIG. 1, said frame having a handle 43. Resilient means for urging relative movement of the plates may be constituted by leaf spring 45 or alternatively an internal resilient means equivalent to the coil spring 35 of FIG. 5. A handle 42 secured to upper plate 40 is also provided.

It is apparent that in this construction, as the plate 40 is moved away from plate 39, the volume of each chamber 41 defined by the bellows 44 will increase to independently reduce the pressure within each chuck 38. This construction is particularly desirable when there are provided more chucks than there are eggs to be picked up necessitating that at least some of the chucks be in open communication with the atmosphere. However, since an individual vacuum is created for each chuck and since there is no communication between the individual chamber 41, the vacuum will still be created in each chuck engaged by an egg.

Figure 7:
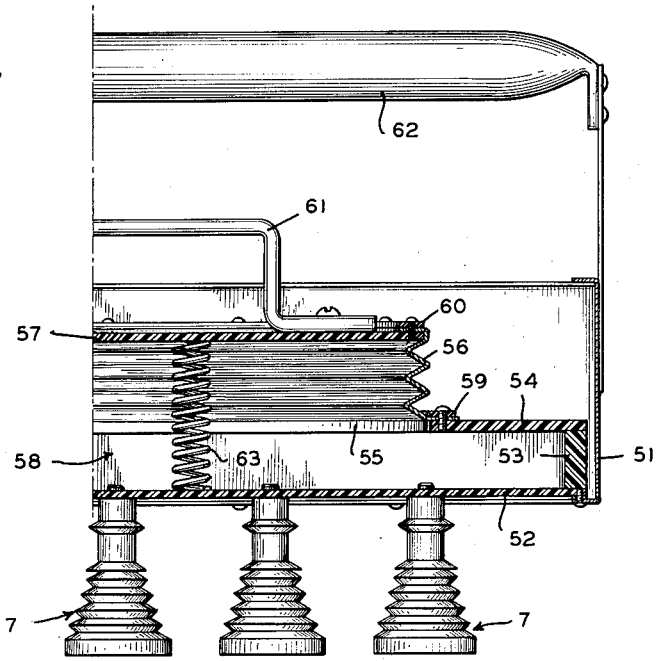
FIG. 7 is a fragmentary section showing another modification wherein a single bellows is used, the diameter of the bellows being less than the diameter of the lower plate.

In the modifications shown in FIGS. 1, 2, 3 and 4, the diameter of the bellows is preferably greater than the diameter of both the upper and lower plates. When these plates are rectangular, the bellows, when mounted as illustrated in these figures, would also be rectangular. It is frequently difficult to fashion a rectangular bellows and still maintain it air-tight. FIG. 7 illustrates another embodiment wherein the shape of the bellows may be different from the shape of the plates. In this modification, the lower end of the bellows is not connected directly to the lower plate.

Referring to FIG. 7, the base member comprises a plate 52 having a plurality of vacuum chucks mounted thereon in the same manner described in the previous embodiments. Spaced above plate 52 is another plate 54 having a central opening 55 therethrough. Plates 52 and 54 are connected by means of spacing block 53 positioned between plates 52 and 54 near the peripheries thereof.

Positioned above plate 54 there is a movable plate 57 of smaller diameter than plate 52. A bellows, preferably a circular bellows 56, is mounted between plate 57 and plate 54 with the upper end of the bellows secured near the periphery of plate 57 by means of strip 60. The lower end of the bellows is secured to the plate 54 around the periphery of opening 55 by means of strip 59. It is evident that in this construction the shape of the bellows is independent of the shape of plate 52. The plate 52 is secured to frame 51 which is provided with a handle 62. A handle 61 is secured to the upper surface of plate 57.

This modification is used in precisely the same manner as the modifications of FIGS. 1–4. If desirable, a coil spring 63 or any other type of spring means may be provided to resiliently urge plate 57 either toward or away from plate 52 in order to vary the size of the chamber 58 defined between the plates. The spring means may be a coil spring or a leaf spring as described in connection with the other embodiments.

Figure 8:
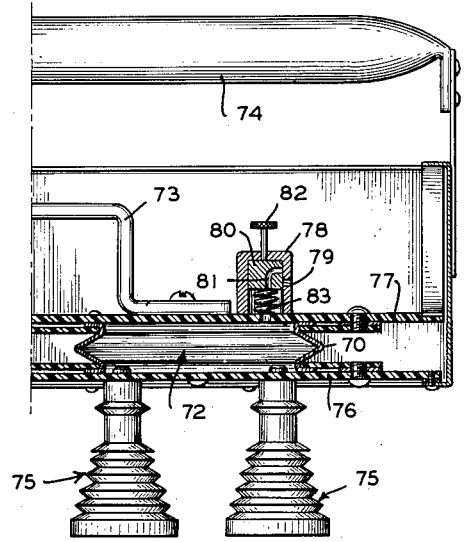
FIG. 8 is a fragmentary section showing another modification wherein there is provided a plurality of bellows with a plurality of chucks in communication with the chamber defined by each bellows.

In FIG. 8 there is shown another embodiment wherein there are provided a plurality of bellows which define a plurality of chambers. This modification is similar to that shown in FIG. 6 except that a plurality of chucks 75 communicate with each chamber. More particularly, there is provided a lower plate 76, a movable plate 77 and a plurality of bellows 70 to define chambers 72 between the plates. These bellows are secured between the plates in the same manner as the bellows of FIG. 6. The bellows in this modification may have any desirable cross-section.

This modification is particularly useful when it is desired to pick up 30 eggs arranged in a 5 x 6 pattern and it is desired to transfer half the eggs to one tray and the other half to another tray. By providing two bellows, each one defining a chamber with which 15 chucks (arranged 3 x 5) are in communication, 30 eggs can be picked up at one time.

If the vacuum in one chamber is broken, the eggs held by the chucks in communication with this chamber would be released. In order to separately break the vacuum in each chamber, there is provided separate valve means for controlling communication between each chamber and the atmosphere. Such a valve may comprise a hollow body 78 having a passageway 79 through the wall thereof.

Positioned within the body is a piston 80 having a passageway 81 therethrough, one end of the passageway being in communication with the chamber 72 and with the other end of the passageway being adapted to be placed in alignment with the opening 79 upon depression of the plunger 82. A spring 83 may be provided to normally maintain the piston in the upward position thereby interrupting communication between the passageway 81 and the opening 79.

If desired, there may be provided in each of the above described modifications a similar valve means or any other valve means for controlling communication between the chamber and/or chambers and the atmosphere. For example, when such a valve is provided in the modification shown in FIG. 5, depression of the plunger of the valve will place chamber 31 in communication with the atmosphere and break the vacuum in the vacuum chucks permitting the release of the articles held by the chucks. In the absence of such a valve, it is necessary to urge the handle 32 away from handle 33 in order to release the articles.

Although in the preferred construction it is preferable to supply spring means to assist in moving the movable plate relative to the fixed plate, it is evident that no spring means are necessary. Furthermore, by fashioning the bellows out of resilient material, such as rubber, the elasticity of the bellows may be utilized to supply the resilient biasing of one plate relative to the other plate and thereby eliminate the need for separate spring means.

Since the devices of the present invention are preferably operated by hand, it is evident that continued use may tire the operator. In order to assist the operator in creating relative movement between the handles, it may be desirable to add levers or other similar mechanical structure (not shown) to attain a mechanical advantage which will minimize muscular fatigue.

In the accompanying drawings, accordion bellows have been shown as having V-shaped folds. It is evident that the crease of the fold does not have to be a sharp crease, it being merely necessary that there be sufficient reverse fold to permit extension of the bellows a sufficient amount.

In the prior art devices, where the source of vacuum is a vacuum pump connected by conduits, the operator could not readily sense the presence of too great vacuum. Frequently, some of the eggs to be picked up may be cracked and when utilizing too great a vacuum, the contents of the eggs would be sucked into the chamber. This, of course, necessitated frequent disassembly and cleaning of the prior art devices.

On the contrary, the vacuum according to the present invention is created in situ by the operator and the operator can apply just sufficient pressure to the handles to create enough vacuum to pick up the articles without danger of removing the contents of the cracked eggs if there be any. Conversely, when the vacuum is not great enough to pick up the articles, the operator can bring the handles closer together to create more vacuum to pick up the eggs. Such a situation frequently occurs when the number of eggs to be picked up does not equal the number of vacuum chucks.

It is evident that the device of the present invention is not limited to picking up eggs but may be used for picking up fruits, light bulbs, cans, balls and similar articles.

The chucks may be arranged on the base member in any desirable manner. When used with eggs, the two arrangements presently used are six rows of chucks with six chucks in each row, or five rows of chucks with six chucks in each row. The size of the bore 26 is not critical. For example, the size of the bore may vary between .020 and .090 inch.

The egg chucks used in the device of the present invention may be of any type conventionally used in the prior art devices. Similarly, the chucks can be secured to the plate in any desirable manner. However, it is preferable to use chucks having accordion bellows because the use of such chucks makes it easier to pick up at the same time eggs of different size.

We claim:

1. In a device for picking up articles by means of vacuum, a first plate having a plurality of vacuum chuck means mounted on one side thereof in a horizontally spaced apart predetermined relationship from each other, a second plate positioned on the other side of said first plate, flexible means between said plates defining at least one chamber therebetween, conduit means providing communication between said chuck means and said chamber, one of said plates being movable relative to the other to vary the volume of said chamber whereby when articles are engaged by said chuck means and said movable plate is moved to increase the volume of said chamber, a partial vacuum is created in said chuck means to hold said articles in secure engagement therewith.

2. A device for picking up articles as recited in claim 1 wherein a plurality of chuck means are in communication with one chamber.

3. A device for picking up articles are recited in claim 1 wherein there are provided a plurality of chambers and an individual chuck means is in communication with an individual chamber.

4. In a device for picking up articles by means of vacuum, a base plate, a plurality of hollow vacuum chuck means for engaging the articles to be picked up, said vacuum chuck means being mounted on one side of said plate in a horizontally spaced apart predetermined relationship from each other, a movable plate on the other side of said base plate and generally parallel thereto, flexible means between said plates defining a chamber therebetween, said base plate having therethrough, for each chuck means, a passageway providing communication between said chuck means and said chamber whereby when the articles are engaged by said chuck means and said movable plate is moved away from said base plate, a partial vacuum is created in said chuck means to hold said articles in secure engagement therewith.

5. A device for picking up articles as recited in claim 4 having resilient means biasing said movable plate for movement relative to said base plate.

6. A device for picking up articles as recited in claim 4 wherein valve means are provided for controlling communication between said chamber and the atmosphere.

7. A device for picking up articles as recited in claim 4 wherein each chuck means comprises an accordion bellows.

8. A device for picking up articles as recited in claim 4 wherein said flexible means is a flexible tubular member one end of which is secured near the periphery of said base plate and the other end of which is secured near the periphery of said movable plate.

9. A device for picking up articles as recited in claim 8 wherein said flexible tubular member comprises an accordion bellows.

10. A device for picking up articles as recited in claim 8 wherein each chuck means comprises an accordion bellows and there is provided a frame, said base plate being secured to said frame, said frame and said movable plate having handle means.

11. In a device for picking up articles by means of vacuum, a base plate, a plurality of hollow vacuum chuck means for engaging the articles to be picked up, said chuck means being mounted on one side of said base plate in a horizontally spaced apart predetermined relationship from each other, a movable plate on the other side of said base member and generally parallel thereto, flexible means between said plates defining a plurality of chambers therebetween, said base plate having therethrough, for each chuck means and each chamber, a passageway providing communication between said chuck means and said chamber whereby when the articles are engaged by said chuck means and said movable plate is moved away from said base plate, a partial vacuum is created in each chuck means engaging an article to hold said articles in secured engagement therewith.

12. A device for picking up articles as recited in claim 11 wherein there are provided resilient means biasing said movable plate for movement relative to said base plate.

13. A device for picking up articles as recited in claim 11 wherein each chuck means comprises an accordion bellows.

14. A device for picking up articles as recited in claim 11 wherein said flexible means comprises a plurality of flexible tubular members, one for each vacuum chuck, each tubular member surrounding one passageway with one end being secured to the base plate and the other end being secured to the movable plate.

15. A device for picking up articles as recited in claim 14 wherein each flexible tubular member comprises an accordion bellows.

16. A device as recited in claim 1 wherein there are provided a plurality of chambers and a plurality of chucks communicating with each chamber.

17. A device as recited in claim 1 wherein said flexible means comprises at least one accordion bellows, one end of which is secured to the first plate, the other end of which is secured to the second plate.

18. In a device for picking up articles by means of vacuum, a horizontal base plate, a plurality of downwardly directed hollow vacuum chuck means for engaging the articles to be picked up, each of said vacuum chuck means being secured on the bottom of said plate in a horizontally spaced apart predetermined relationship from each other, a movable plate positioned above said base plate and generally parallel thereto, at least one flexible bellows positioned between said plates, the bottom end of said bellows being immovable relative to said base plate, the other end of said bellows being secured to said movable plate for movement therewith, said plates and said bellows defining a chamber of variable volume, a plurality of passageways through said base plate, said passageways providing communication between said chuck means and said chamber whereby when the articles are engaged by said chuck means and said movable plate is moved away from said base plate, a partial vacuum is created in said chuck means to hold said articles in secure engagement therewith.

19. In a device for picking up articles by means of vacuum, a frame defined by a plurality of upright panels, a horizontal base plate secured to said frame, a plurality of downwardly directed hollow vacuum chuck means for engaging the articles to be picked up, each of the vacuum chuck means comprising an accordion bellows, one end of which is secured to said base plate, the other end being free of said base plate, each of said vacuum chuck means being secured on the bottom of said plate in a horizontally spaced apart predetermined relationship from each other, a movable plate positioned above said base plate and generally parallel thereto, at least one flexible bellows positioned between said plates with the bottom end of said bellows being immovable relative to said base plate, the other end of said bellows being secured to said movable plate for movement therewith, said plates and said bellows defining a chamber of variable volume, a plurality of passageways through said base plate, said passageways providing communication between said chuck means and said chamber whereby when the articles are engaged by said chuck means and said movable plate is moved away from said base plate, a partial vacuum is created in said chuck means to hold said articles in secure engagement therewith, said movable plate having secured to the upper side thereof a handle and said frame having secured thereto a handle, said latter handle being spaced above the handle secured to said movable plate, said handles being sufficiently close together so that both handles can be grasped by a hand of the user of the device when the handle secured to the movable plate is in its lower position whereby when both of said handles are grasped by the hand and the hand is closed, the movable plate will be urged away from the base plate to create said vacuum.

20. A device as recited in claim 19 wherein the periphery of the movable plate lies within the enclosure defined by said panels.

References Cited in the file of this patent

UNITED STATES PATENTS

| | | |
|---|---|---|
| 1,757,529 | Jones | May 6, 1930 |
| 2,204,738 | Swan | June 18, 1940 |
| 2,558,479 | Miller | June 26, 1951 |
| 2,607,620 | Oliveri | Aug. 19, 1952 |
| 2,658,789 | Tellier | Nov. 10, 1953 |
| 2,798,757 | Jackson | July 9, 1957 |
| 2,803,485 | Page et al. | Aug. 20, 1957 |